United States Patent
Gleeson et al.

(10) Patent No.: US 10,289,842 B2
(45) Date of Patent: May 14, 2019

(54) METHOD AND APPARATUS FOR PROTECTING KERNEL CONTROL-FLOW INTEGRITY USING STATIC BINARY INSTRUMENTATION

(71) Applicant: Samsung Electronics Co., Ltd., Suwon-si, Gyeonggi-do (KR)

(72) Inventors: James Gleeson, Burlington (CA); Ahmed Azab, Mountain View, CA (US); Wenbo Shen, Cupertino, CA (US); Rohan Bhutkar, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 191 days.

(21) Appl. No.: 15/340,447

(22) Filed: Nov. 1, 2016

(65) Prior Publication Data

US 2017/0140148 A1 May 18, 2017

Related U.S. Application Data

(60) Provisional application No. 62/254,659, filed on Nov. 12, 2015.

(51) Int. Cl.
*G06F 21/00* (2013.01)
*G06F 21/55* (2013.01)
*G06F 21/12* (2013.01)
*G06F 21/57* (2013.01)
*G06F 8/41* (2018.01)

(52) U.S. Cl.
CPC .......... *G06F 21/556* (2013.01); *G06F 21/125* (2013.01); *G06F 21/57* (2013.01); *G06F 8/41* (2013.01); *G06F 2221/033* (2013.01)

(58) Field of Classification Search
CPC ...... G06F 21/556; G06F 21/57; G06F 21/125; G06F 2221/033; G06F 8/41
See application file for complete search history.

(56) References Cited

U.S. PATENT DOCUMENTS

| 6,550,058 B1* | 4/2003 | Wynn | G06F 8/41 |
| | | | 717/158 |
| 6,711,672 B1* | 3/2004 | Agesen | G06F 8/52 |
| | | | 712/227 |
| 6,983,364 B2* | 1/2006 | Gougeon | G06Q 20/341 |
| | | | 713/165 |

(Continued)

OTHER PUBLICATIONS

Wagle et al; StackGuard: Simple Stack Smash Protection for GCC; GCC Developers Summit; 2003.
Kayaalp et al; Branch Regulation: Low-Overhead Protection from Code Reuse Attacks; Air Force Research Laboratory and National Science Foundation.

*Primary Examiner* — John B King
(74) *Attorney, Agent, or Firm* — Jefferson IP Law, LLP (57) ABSTRACT

An apparatus and a method for protecting kernel control-flow integrity using static binary instrumentation are provided. The method includes configuring a compiler to reserve a register in a processor, compiling source code into a binary based on the configured compiler, and modifying the binary to prevent exploits using the reserved register, wherein the reserved register stores a first encryption key for encrypting and decrypting return addresses. The reserved register stores an encryption key that is used to encrypt and decrypt return addresses to prevent control flow exploits.

18 Claims, 7 Drawing Sheets

(56) References Cited

U.S. PATENT DOCUMENTS

| | | | |
|---|---|---|---|
| 7,272,748 B1* | 9/2007 | Conover | G06F 11/1407 |
| | | | 712/233 |
| 7,581,089 B1* | 8/2009 | White | G06F 12/1416 |
| | | | 712/242 |
| 7,870,201 B2* | 1/2011 | Madams | H04L 63/083 |
| | | | 455/414.3 |
| 2001/0052053 A1* | 12/2001 | Nemirovsky | G06F 9/546 |
| | | | 711/138 |
| 2003/0217277 A1* | 11/2003 | Narayanan | G06F 11/2284 |
| | | | 713/187 |
| 2004/0133777 A1* | 7/2004 | Kiriansky | G06F 21/53 |
| | | | 713/166 |
| 2008/0060077 A1 | 3/2008 | Cowan et al. | |
| 2013/0298231 A1* | 11/2013 | Jiang | H04L 63/08 |
| | | | 726/22 |
| 2014/0173290 A1* | 6/2014 | Kaplan | G06F 21/52 |
| | | | 713/189 |
| 2014/0173293 A1* | 6/2014 | Kaplan | G06F 21/54 |
| | | | 713/190 |
| 2014/0298038 A1* | 10/2014 | Gauravaram | H04L 9/0643 |
| | | | 713/189 |
| 2016/0170769 A1* | 6/2016 | LeMay | G06F 9/3863 |
| | | | 713/190 |
| 2017/0046280 A1* | 2/2017 | Driessen | G06F 12/1408 |
| 2017/0329961 A1* | 11/2017 | Shanbhogue | G06F 21/52 |
| 2018/0089427 A1* | 3/2018 | Branco | H04L 9/14 |

\* cited by examiner

```
1   void function1 (void) {
2     ...
3     function2(attacker_controlled_var);
4     return;
5   }
6
7   void function2 (char * src) {
8     char stackvar[8];
9     strcpy (&stackvar, src)
10    ...
11    return;
12  }
13
14
15
16
17  void target(void) {
18    ...
19    exec("/bin/sh", NULL, NULL);
20    return;
21  }
22
23  void strcpy(char * dst, char * src)
24    size_t i = 0;
25    for (i = 0; src[i] != '\0'; i++) {
26      dst[i]=src[i];
27    }
28  }
```

310 — FP: 128, Stack: {100}

320

330 — FP: 4, Stack: {100, 128}

FP: 4, Stack: {100, 19}

340 — FP: 4, Stack: {100}

FIG. 3

```
extern void (*function_ptr1)(void);

void start(void) {
    ...
    function_ptr1();                    ─── 410
    ...
} void function1(void) {
    ...
    //some instructions sets registers X0, X1
    ...
    function_ptr2(X1);                  ─── 420
    ...
} void function2(void) {
    ...
    //some instructions sets register X2
    ...
    function_ptr3(X2)                   ─── 430
    ...
} void payload(int arg0, int arg1, int arg2) {
    ...
    if (arg0 == 0 && arg1 ==1 && arg2 == 2) {
        //attacker's desired code
    }
    ...
}
```

METHOD AND APPARATUS FOR PROTECTING KERNEL CONTROL-FLOW INTEGRITY USING STATIC BINARY INSTRUMENTATION

CROSS-REFERENCE TO RELATED APPLICATION(S)

This application claims the benefit under 35 U.S.C. § 119(e) of a U.S. Provisional application filed on Nov. 12, 2015, in the U.S. Patent and Trademark Office and assigned Ser. No. 62/254,659, the entire disclosure of which is hereby incorporated by reference.

BACKGROUND

In modern operating systems, a kernel generally separates a virtual memory into a kernel space and a user space. This separation is to provide memory protection that protects system data and functionality from faults and from malicious behavior. If a malicious application is able to execute instructions in the kernel space, the malicious application may compromise the security of the system, thereby exposing the entire system to the malicious application. For example, a malicious application could install a rootkit, a virus, ransomware, a trojan, and so forth.

TECHNICAL FIELD

The present disclosure relates to protecting an executable binary from control flow exploits. More particularly, the present disclosure relates to a method and apparatus for protecting kernel control-flow integrity.

SUMMARY

Aspects of the present disclosure are to address at least the above-mentioned problems and/or disadvantages and to provide at least the advantages described below. Accordingly, an aspect of the present disclosure is to provide an apparatus and method for a device state based encryption key.

In accordance with an aspect of the present disclosure, a method of compiling a binary is disclosed. The method includes configuring a compiler to reserve a register in a processor, compiling source code into a binary based on the configured compiler, and modifying the binary to prevent exploits using the reserved register.

In accordance with an aspect of the present disclosure, an electronic device is disclosed. The electronic devices includes a memory configured to store data and a processor having at least one hardware register. The processor is configured to receive a compiler configuration to reserve a register in a processor, compile source code into a binary based on the configured compiler, and modify the binary to prevent exploits using the reserved register, wherein the reserved register stores a first encryption key for encrypting and decrypting return addresses.

In accordance with an aspect of the present disclosure, a method of executing a binary in a processor is disclosed. The method comprises receiving a next instruction, determining if the next instruction corresponds to a particular instruction, when the next instruction corresponds to a return instruction, copying a first encrypted return address of a set of encrypted return addresses into a first register and decrypting a first return address based on a first encryption key, when the next instruction corresponds to a transition point, decrypting the set of encrypted return addresses based on the first encryption key and encrypting the set of return addresses based on a second encryption key, and when the next instruction corresponds to a direct branch instruction, encrypting a second address in the first register and adding the second encrypted return address to the set of encrypted return addresses, wherein the first encryption key is stored in a reserved register, and wherein the set of encrypted return addresses is stored in a memory.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 8, discussed below, and the various embodiments used to describe the principles of the present disclosure in this disclosure are by way of illustration only and should not be construed in any way that would limit the scope of the disclosure. Those skilled in the art will understand that the principles of the present disclosure may be implemented in any suitably arranged system having an operating system. The terms used to describe various embodiments are exemplary. It should be understood that these are provided to merely aid the understanding of the description, and that their use and definitions in no way limit the scope of the present disclosure. Numeric terms such as first, second, and the like are used to differentiate between similar objects and are in no way intended to represent a chronological order, unless where explicitly stated otherwise. A set is defined as a non-empty set including at least one element.

Figure 1:
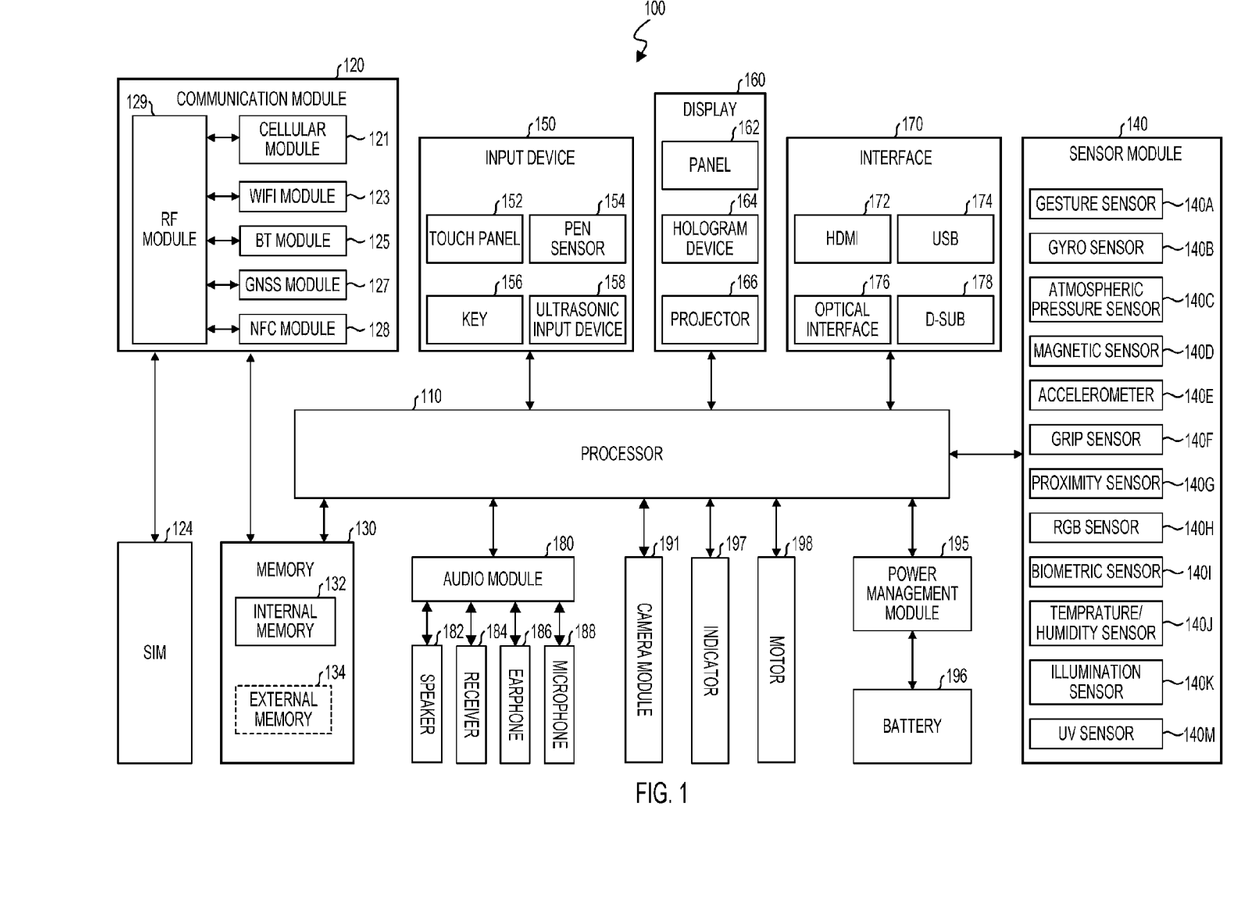
FIG. 1 is a block diagram of an electronic device according to various embodiments of the present disclosure.

FIG. 1 is a block diagram of an electronic device according to various embodiments of the present disclosure.

Referring to FIG. 1, an electronic device 100 may include at least one processor (for example, an application processor (AP)) 110, a communication module 120, a subscriber identification module (SIM) 124, a memory 130, a sensor module 140, an input device 150, a display 160, an interface 170, an audio module 180, a camera module 191, a power management module 195, a battery 196, an indicator 197, and a motor 198.

The processor 110 may, for example, control a plurality of hardware or software components that are connected to the processor 110 by executing an OS or an application program and may perform processing or computation on various types of data. The processor 110 includes a plurality of registers for loading and processing machine instructions of an instruction set. The processor 110 may also include memory, such as a level 1 (L1) cache and a level 2 (L2) cache for caching content to speed up memory operations. As described herein, registers may be important for system purposes and include features to prevent the content in the registers from being disclosed. The registers are therefore different from the various memory as described herein.

The processor 110 may be implemented, for example, as a system on chip (SoC). According to an embodiment of the present disclosure, the processor 110 may further include a graphics processing unit (GPU) and/or an image signal processor (ISP). The processor 110 may load a command or data received from at least one other component (for example, a non-volatile memory), process the loaded command or data, and store various types of data in the non-volatile memory.

The communication module 120 may include, for example, the cellular module 121, a wireless fidelity (Wi-Fi) module 123, a Bluetooth (BT) module 125, a global navigation satellite system (GNSS) module 127 (for example, a global positioning system (GPS) module, a GLONASS module, a BeiDou module, or a Galileo module), an NFC module 128, and a radio frequency (RF) module 129.

The cellular module 121 may provide services such as voice call, video call, short message service (SMS), or an Internet service through a communication network. According to an embodiment of the present disclosure, the cellular module 121 may identify and authenticate the electronic device 100 within a communication network, using the SIM (for example, a SIM card) 124.

According to an embodiment of the present disclosure, the cellular module 121 may perform at least a part of the functionalities of the processor 110. According to an embodiment of the present disclosure, the cellular module 121 may include a CP.

Each of the Wi-Fi module 123, the BT module 125, the GNSS module 127, and the NFC module 128 may include, for example, a processor for processing data transmitted and received by the module. According to an embodiment of the present disclosure, at least a part (for example, two or more) of the cellular module 121, the Wi-Fi module 123, the BT module 125, the GNSS module 127, and the NFC module 128 may be included in a single integrated circuit (IC) or IC package.

The RF module 129 may transmit and receive, for example, communication signals (for example, RF signals). The RF module 129 may include, for example, a transceiver, a power amplifier module (PAM), a frequency filter, a low noise amplifier (LNA), an antenna, or the like. According to an embodiment of the present disclosure, at least one of the cellular module 121, the Wi-Fi module 123, the BT module 125, the GNSS module 127, and the NFC module 128 may transmit and receive RF signals via a separate RF module.

The SIM 124 may include, for example, a card including the SIM and/or an embedded SIM. The SIM 124 may include a unique identifier (for example, integrated circuit card identifier (ICCID)) or subscriber information (for example, international mobile subscriber identity (IMSI)).

The memory 130 may include, for example, an internal memory 132 or an external memory 134. The internal memory 132 may be at least one of, for example, a volatile memory (for example, dynamic random access memory (DRAM), static RAM (SRAM), or synchronous dynamic RAM (SDRAM)), and a non-volatile memory (for example, one time programmable read only memory (OTPROM), programmable ROM (PROM), erasable and programmable ROM (EPROM), electrically erasable and programmable ROM (EEPROM), mask ROM, flash ROM, flash memory (for example, NAND flash memory, or NOR flash memory), a hard drive, and a solid state drive (SSD)).

The external memory 134 may further include, for example, a flash drive such as a compact flash (CF), a secure digital (SD), a micro-SD, a mini-SD, an extreme digital (xD), a multi-media card (MMC), or a memory stick. The external memory 134 may be operatively and/or physically coupled to the electronic device 100 via various interfaces.

The sensor module 140 may, for example, measure physical quantities or detect operational states associated with the electronic device 100, and convert the measured or detected information into electric signals. The sensor module 140 may include at least one of, for example, a gesture sensor 140A, a gyro sensor 140B, an atmospheric pressure sensor 140C, a magnetic sensor 140D, an accelerometer 140E, a grip sensor 140F, a proximity sensor 140G, a color sensor (for example, a red, green, blue (RGB) sensor) 140H, a biometric sensor 140I, a temperature/humidity sensor 140J, an illumination sensor 140K, and an ultra violet (UV) sensor 140M. Additionally or alternatively, the sensor module 140 may include, for example, an electrical-nose (E-nose) sensor, an electromyography (EMG) sensor, an electroencephalogram (EEG) sensor, an electrocardiogram (ECG) sensor, an infrared (IR) sensor, an iris sensor, and/or a finger print sensor. The sensor module 140 may further include a control circuit for controlling one or more sensors included therein. According to various embodiments, the electronic device 100 may further include a processor configured to control the sensor module 140, as a part of or separately from the processor 110. Thus, while the processor 110 is in a sleep state, the control circuit may control the sensor module 140.

The input device 150 may include, for example, a touch panel 152, a (digital) pen sensor 154, a key 156, or an ultrasonic input device 158. The touch panel 152 may operate in at least one of, for example, capacitive, resistive, infrared, and ultrasonic schemes. The touch panel 152 may further include a control circuit. The touch panel 152 may further include a tactile layer to thereby provide haptic feedback to the user.

The (digital) pen sensor 154 may include, for example, a detection sheet which is a part of the touch panel or separately configured from the touch panel. The key 156 may include, for example, a physical button, an optical key, or a keypad. The ultrasonic input device 158 may identify data by detecting, using a microphone (for example, a microphone 188), ultrasonic signals generated from an input tool.

The display 160 may include a panel 162, a hologram device 164, or a projector 166. The panel 162 may be configured to be, for example, flexible, transparent, or wearable. The panel 162 and the touch panel 152 may be implemented as a single module. According to an embodiment of the present disclosure, the panel 162 may include a pressure sensor (or a force sensor) for measuring the force of the pressure of a user touch. The pressure sensor may be integrated with the touch panel 152 or may include one or more sensors, separately from the touch panel 152. The hologram device 164 may utilize the interference of light waves to provide a three-dimensional image in empty space. The projector 166 may provide an image by projecting light on a screen. The screen may be positioned, for example, inside or outside the electronic device 100. According to an embodiment of the present disclosure, the display 160 may further include a control circuit for controlling the panel 162, the hologram device 164, or the projector 166.

The interface 170 may include, for example, a high definition media interface (HDMI) 172, a universal serial bus (USB) 174, an optical interface 176, or a D-subminiature (D-sub) 178. Additionally or alternatively, the interface 170 may include, for example, a mobile high-definition link (MHL) interface, an SD/multimedia card (MMC) interface, or an infrared data association (IrDA) interface.

The audio module 180 may convert a sound to an electrical signal, and vice versa. The audio module 180 may process sound information input into, or output from, for example, a speaker 182, a receiver 184, an earphone 186, or the microphone 188.

The camera module 191 may capture, for example, still images and a video. According to an embodiment of the present disclosure, the camera module 191 may include one or more image sensors (for example, a front sensor or a rear sensor), a lens, an ISP, or a flash (for example, a light emitting diode (LED) or a xenon lamp).

The power management module 195 may manage, for example, power of the electronic device 100. According to an embodiment of the present disclosure, the power management module 195 may include a power management IC (PMIC), a charger IC, or a battery or fuel gauge. The PMIC may adopt a wired and/or wireless charging scheme. The wireless charging may be performed, for example, in a magnetic resonance scheme, a magnetic induction scheme, or an electromagnetic wave scheme, and may use additional circuits for wireless charging, such as a coil loop, a resonance circuit, or a rectifier. The battery fuel gauge may measure, for example, a charge level, a voltage while charging, current, or temperature of the battery 196. The battery 196 may include, for example, a rechargeable battery and/or a solar battery.

The indicator 197 may indicate specific states of the electronic device 100 or a part of the electronic device 100 (for example, the processor 110), for example, boot status, message status, or charge status. The motor 198 may convert an electrical signal into a mechanical vibration and generate vibrations or a haptic effect. While not shown, the electronic device 100 may include a processing device for supporting mobile TV (for example, a graphical processing unit (GPU)). The processing device for supporting mobile TV may process media data compliant with, for example, digital multimedia broadcasting (DMB), digital video broadcasting (DVB), or MediaFLO.

Each of the above-described components of the electronic device may include one or more parts and the name of the component may vary with the type of the electronic device. According to various embodiments, the electronic device may be configured to include at least one of the afore-described components. Some component may be omitted from or added to the electronic device. According to various embodiments, one entity may be configured by combining a part of the components of the electronic device, to thereby perform the same functions of the components prior to the combining.

Figure 2:
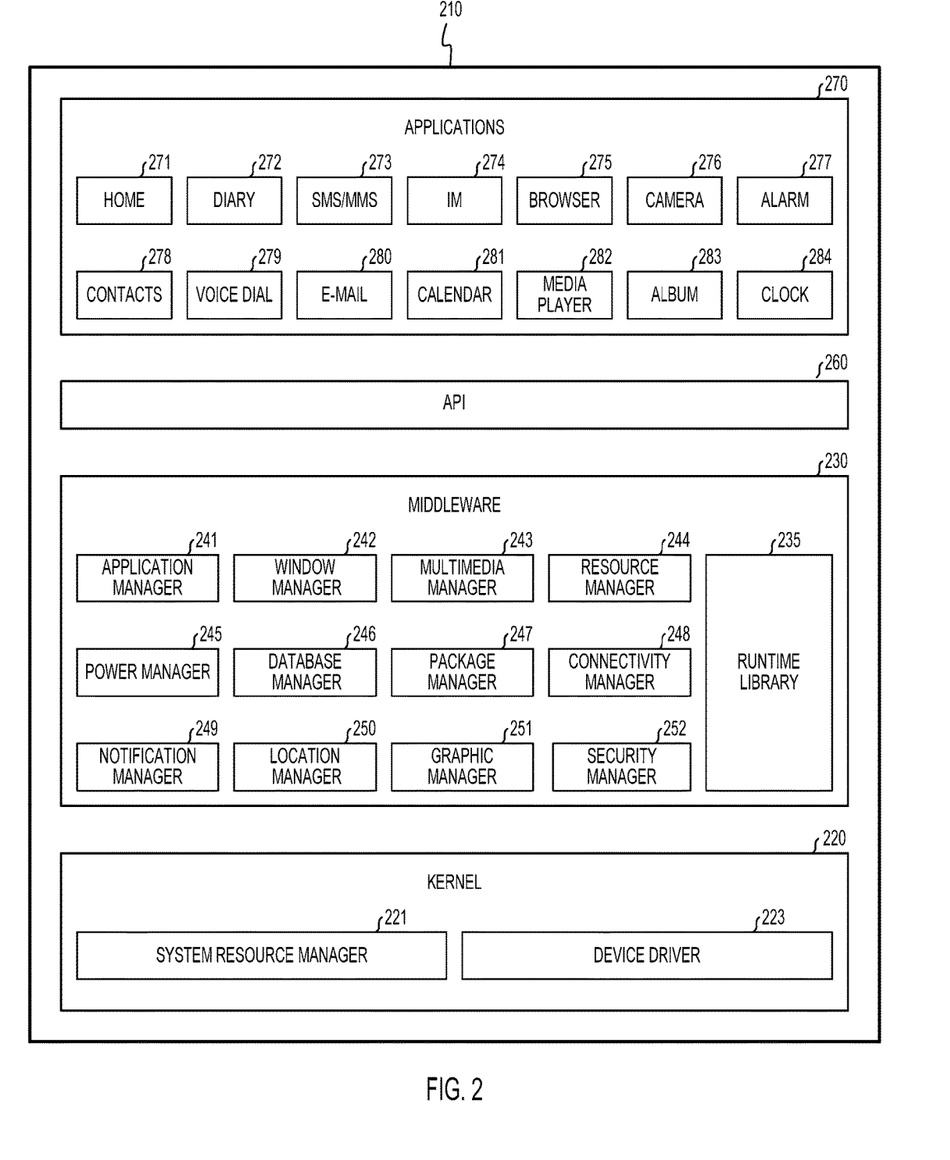
FIG. 2 is a block diagram of a programming module according to various embodiments of the present disclosure.

FIG. 2 is a block diagram of a programming module according to various embodiments of the present disclosure.

Referring to FIG. 2, according to an embodiment of the present disclosure, a programming module 210 may include an operating system (OS) that controls resources related to an electronic device (for example, the electronic device 201) and/or various applications executed on the OS (for example, the application programs 247). For example, the OS may be Android®, iOS®, Windows®, Symbian®, Tizen®, Bala®, or the like.

The programming module 210 may include a kernel 220, middleware 230, an API 260, and/or applications 270. At least a part of the programming module 210 may be preloaded on the electronic device or downloaded from an external electronic device.

The kernel 220 may include, for example, a system resource manager 221 and a device driver 223. The system resource manager 221 may control, allocate, or deallocate system resources. According to an embodiment of the present disclosure, the system resource manager 221 may include a processor manager, a memory manager, or a file system manager. The device driver 223 may include, for example, a display driver, a camera driver, a BT driver, a shared memory driver, a USB driver, a keypad driver, a Wi-Fi driver, an audio driver, or an inter-process communication (IPC) driver.

The middleware 230 may, for example, provide a function required commonly for the applications 270 or provide various functionalities to the applications 270 through the API 260 so that the applications 270 may efficiently use limited system resources available within the electronic device. According to an embodiment of the present disclosure, the middleware 230 may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a complier uses to add a new function in a programming language during execution of an application 270. The runtime library 235 may perform I/O management, cryptographic functions, memory management, a function related to arithmetic function, or the like.

The application manager 241 may manage, for example, the life cycle of at least one of the applications 270. The window manager 242 may manage graphical user interface (GUI) resources used for a screen. The multimedia manager 243 may determine formats required to play back various media files and may encode or decode a media file using a coder/decoder (CODEC) suitable for the format of the media file. The resource manager 244 may manage resources such as a source code of at least one application 270, a memory, or storage space.

The power manager 245 may, for example, manage a battery or a power source by operating in conjunction with a basic input/output system (BIOS) and may provide power information required for an operation of the electronic device. The database manager 246 may manage a database for at least one of the applications 270 so that the database may be generated, searched, or modified. The package manager 247 may manage installation or update of an application distributed as a package file.

The connectivity manager 248 may manage, for example, wireless connectivity of Wi-Fi, BT, or the like. The notification manager 249 may indicate or notify an event such as message arrival, a schedule, a proximity alarm, or the like in a manner that does not bother a user. The location manager 250 may mange location information about the electronic device. The graphic manager 251 may manage graphical effects to be provided to the user or related user interfaces. The security manager 252 may provide an overall security function required for system security, user authentication, and the like. The security manager 252 may include a certificated cryptographic library that performs cryptographic functions to secure data while executing in an application space. In an embodiment of the present disclosure, if the electronic device (for example, the electronic device 100) has a telephony function, the middleware 230 may further include a telephony manager to manage a voice or video call function of the electronic device.

A new middleware module may be created and used by combining various functions of the above-described component modules in the middleware 230. The middleware 230 may provide a customized module for each OS type in order to provide differentiated functions. In addition, the middleware 230 may dynamically delete a part of the existing components or add a new component.

The API 260 is, for example, a set of API programming functions, which may be configured differently according to an OS. For example, in the case of Android or iOS, one API set may be provided per platform, whereas in the case of Tizen, two or more API sets may be provided per platform.

The applications 270 may include, for example, one or more applications capable of providing functions such as home 271, dialer 272, SMS/multimedia messaging service (MMS) 273, instant message (IM) 274, browser 275, camera 276, alarm 277, contacts 278, voice dial 279, email 280, calendar 281, media player 282, album 283, or clock 284, health care (for example, measurement of an exercise amount or a glucose level), or providing of environment information (for example, information about atmospheric pressure, humidity, or temperature).

According to an embodiment of the present disclosure, the applications 270 may include an application (for the convenience of description, referred to as 'information exchange application') supporting information exchange between the electronic device (for example, the electronic device 100) and an external electronic device. The information exchange application may include, for example, a notification relay application for transmitting specific information to the external electronic device or a device management application for managing the external electronic device.

For example, the notification relay application may include a function of transmitting notification information generated from another application (for example, an SMS/MMS application, an email application, a health care application, or an environment information application) to the external electronic device. Also, the notification relay application may, for example, receive notification information from the external electronic device and transmit the received notification information to a user.

The device management application may, for example, manage (for example, install, delete, or update) at least a part of functions of the external electronic device communicating with the electronic device (for example, turn-on/turn-off of the external electronic device (or a part of its components) or control of the brightness (or resolution) of the display), an application executed in the external electronic device, or a service (for example, a call service or a message service) provided by the external electronic device.

According to an embodiment of the present disclosure, the applications 270 may include an application (for example, a health care application) designated according to a property (for example, the type of the electronic device as a property of the electronic device is a mobile medical device) of the external electronic device. According to an embodiment of the present disclosure, the applications 270 may include an application received from an external electronic device. According to an embodiment of the present disclosure, the applications 270 may include a preloaded application or a third party application downloadable from a server. The names of components of the programming module 210 according to embodiment of the present disclosure may vary according to the type of an OS.

According to various embodiments, at least a part of the programming module 210 may be implemented in software, firmware, hardware, or a combination of at least two of them. At least a part of the programming module 210 may be implemented (for example, executed) by the processor (for example, the processor 110). At least a part of the programming module 210 may include, for example, a module, a program, a routine, a set of instructions, or a process to execute one or more functions.

The applications 270 are generally executed in a user space where a user application stores data. The user space is a separate memory region from kernel space, where system resources are executed and protected. The API 260, middleware 230, and kernel 220 may prevent an application 270 from accessing content (e.g., memory, processes, functions, etc.) in the kernel space for security purposes. For example, if an application was able to invoke a command shell via the kernel 220, that command shell would have system access and the user would therefore have root level access to the entire system.

However, a control flow exploit may be implemented to use existing code in a malicious way to affect the execution flow. Control flow exploits are particularly applied to a system that uses write-protection to prevent writing of memory content in the code sections of the kernel space. Most modern operating systems use write-protection to limit system access such that the system cannot be modified in a malicious way to, for example, install viruses, trojans, ransomware, root kits, or circumvent file protection.

An example of a control flow exploit is the Android PingPong root, where the attacker was able to use existing kernel code to get root access to the system, which affected the security of devices that used Android. For example, once the Android was rooted, attackers were able to install unauthorized applications.

Control flow exploits are based on injecting undesirable values into the kernel data section to alter the expected behavior of branch instructions. A branch instruction stops the sequential execution of instructions in a compiled binary and causes the execution of the binary to jump to instructions at a different location, which is generally referred to as a function. Thus, the program counter (PC), which is an address of the instructions that are read into the processor for execution, is changed when a branch instruction is executed. When the instructions at the branch are completed, the PC returns to the instruction after the branch instruction. Thus, a return address must be stored for each branch instruction. In the ARM64 instruction set, a return address register (X30) stores a single return address, but a stack in the memory stores previous return addresses.

There are two types of branch instructions in the ARM64 instruction set: a direct branch (a Branch (B) instruction or a Branch with Link (BL) instruction) and an indirect branch (a (Branch to Register) BR instruction or a (Branch with Link to Register) BLR instruction). A direct branch instruction adds a value that is provided as an argument to the PC. The value provided to the direct branch instruction is limited to 10 bits, which limits the size of the jump location to ±128 MB, so the target can be at any location.

However, an indirect branch instruction causes the PC to jump to an address that is stored in a memory location. Therefore, the indirect branch instruction can jump to any location. Typically, an indirect branch is used to begin execution in the middle of a function (e.g., during an optimized switch statement) or when there are multiple functions that may be called, for example, based on the number of arguments.

Both direct and indirect branches with link require a return address to be stored in a register of the processor. However, when a first function calls a second function, the return address of the first function is stored on the stack. In particular, when the second function is compiled, the compiler inserts a prologue instructions at the beginning of the second function and epilogue instructions at the end of the second function. The prologue instructions store the processor state (i.e., register values are copied onto a stack frame of the stack in memory) before executing the second function and the epilogue instructions restore the processor state after execution of the second function (i.e., values of the stack are copied into the registers). A frame pointer is used to identify the location of the stack frame.

In general, there are two types of control flow exploits: overwriting a return address of a branch, which is stored in the stack, and overwriting a pointer, which is stored in the heap. The control flow exploits will be discussed below in detail with reference to FIGS. 3 and 4. Overwriting a return address of a branch to change code control flow is sometimes referred to as return-oriented programming. Overwriting a pointer stored in the heap or any data value that will alter the control flow of jump or branch or call instructions to change code control flow is sometimes referred to as jump-oriented programming.

Figure 3:
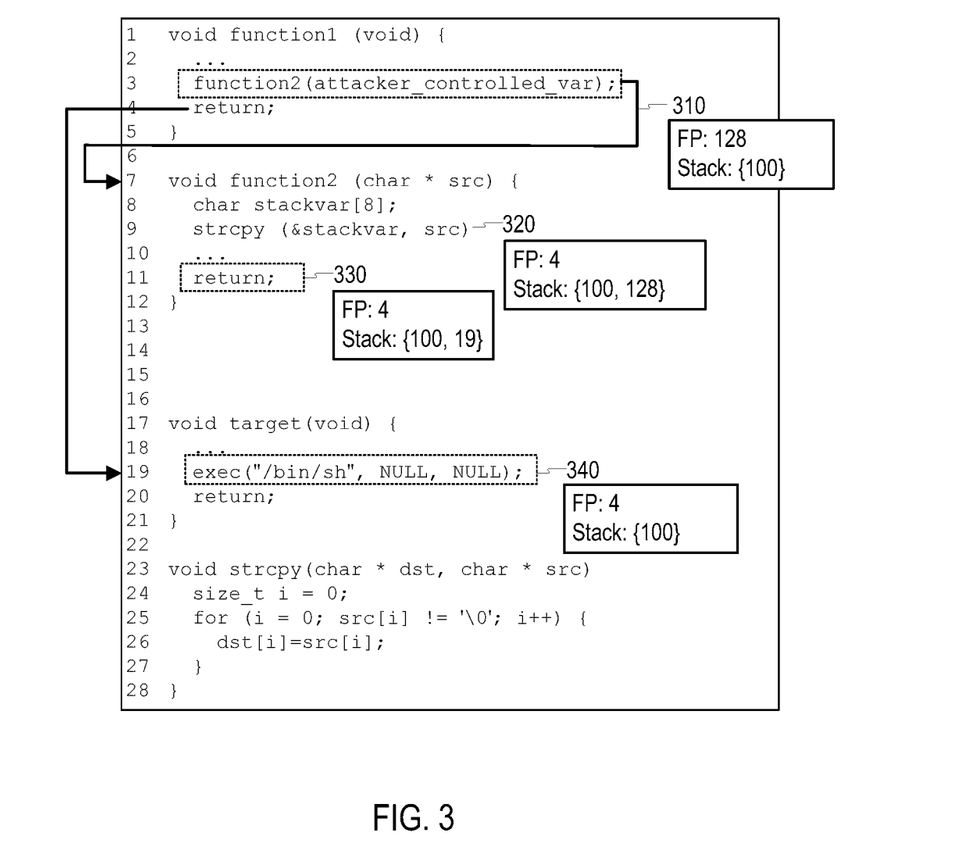
FIG. 3 is a diagram illustrating a control flow exploit according to various embodiments of the present disclosure.

FIG. 3 is a diagram illustrating a control flow exploit.

Referring to FIG. 3, the pseudo code illustrated in FIG. 3 illustrates a control flow exploit to overwrite a return address, which generally requires at least two functions to be executed. For example, if function1 is executed and an attacker is able to control a variable (e.g., attacker_controlled_var), function1 will call function2 at operation 310. During operation 310, the frame pointer register stores a return address (line 128, which is not shown) and a stack stores previous return addresses (line 100, which is not shown). Thus, the return instruction at line 4 is designated to return to line 128.

When function2 executes, the value in the frame pointer register is copied onto the stack and a return address of function1 is placed into the frame pointer. Thus, the frame pointer has 4 as its value and the stack contains values of 100 and 128.

The function2 calls the strcpy function which, as illustrated, expects 8 characters. However, if the attacker controlled variable exceeds 8 characters, the strcpy function call at line 9 may instead overwrite the latest value on the stack to line 19 at operation 320. Therefore, when the execution of function2 advances and executes the return instruction at operation 330, the stack has been modified to contain values of 100 and 19.

When execution of function2 is completed, the most recent return address on the stack (i.e., 19) is copied into the frame pointer. Therefore, when function1 executes the return instruction at line 4, the return address is line 19, which can show any potential malicious behavior such as invoking a shell (i.e., a command line, a terminal, a command shell) with root privileges at operation 340. Therefore, the attacker has compromised the security of the kernel using a control flow exploit by overwriting a return memory address in the stack.

Figure 4:
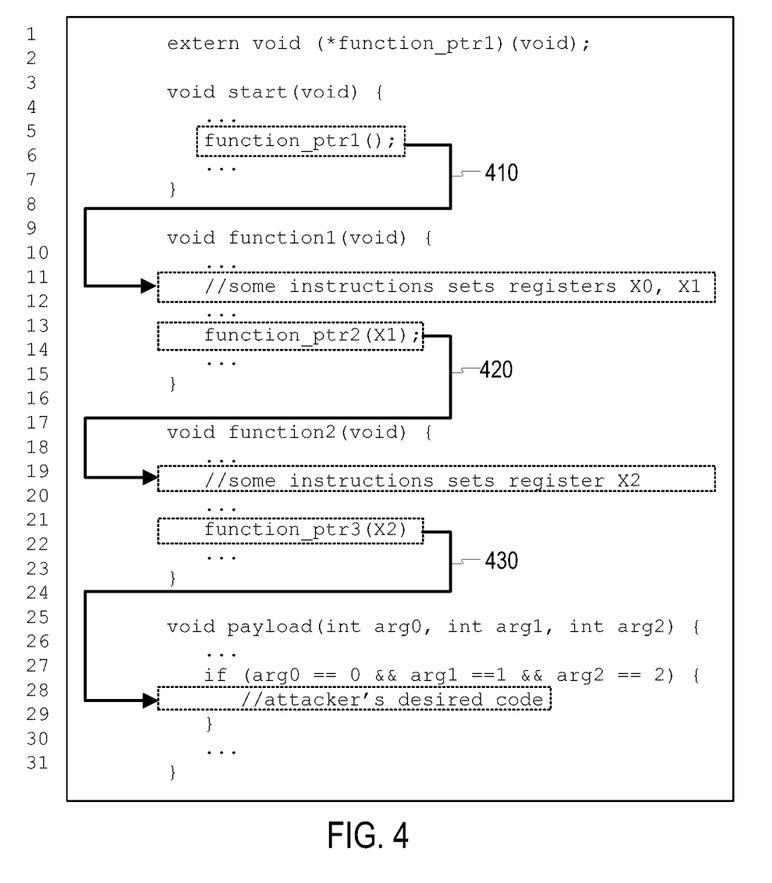
FIG. 4 is a diagram illustrating another control flow exploit according to various embodiments of the present disclosure.

FIG. 4 is a diagram illustrating another control flow exploit.

Referring to FIG. 4, the pseudo code illustrated in FIG. 4 illustrates a control flow exploit to overwrite a pointer in memory. For example, a branch instruction may use a pointer as the target and, therefore, if the attacker is able to overwrite the value of the pointer, the attacker may cause the execution to branch to a payload that compromises the kernel. To perform this type of attack, an attacker must chain together a "gadget" from formed by portions of functions that are chained together. That is, gadgets are contiguous sequences of instructions that can be triggered to run by the attacker and end in an indirect branch instruction that is controlled by the attacker. If the attacker is able to chain gadgets together, the attacker can individually set registers and then induce the gadget to execute a payload function that comprises the security the system by, for example, escalating the attacker's privileges.

For example, at operation 410, the attacker is able to cause function1 to execute, which sets registers X1 and X2 to the attacker's desired values. Also, function1 includes an instruction to branch to a location based on register X1. Accordingly, the attacker is able to induce the execution of function2 at a location where function2 sets values of register X2. Similar to function1, function2 includes an instruction to branch to a location based on register X2 at operation 430, which induces execution of a payload function. However, because the attacker has modified values of the registers, function2 jumps to the attacker's desired code to compromise the system. For example, the attacker's desired code may escalate privileges, install a rootkit, etc. In ARM64, the registers X0 to X7 store the function arguments, with any additional arguments being stored on the stack. As such, when the payload function is executed, the attacker is able to execute the desired code (e.g., a shell) to escalate the attacker's privilege. Thus, in the example of FIG. 4, an attacker is able to trigger a gadget in the chain formed by function1 and function2 without changing the code itself, thereby allowing the attacker to compromise the system.

Figure 5:
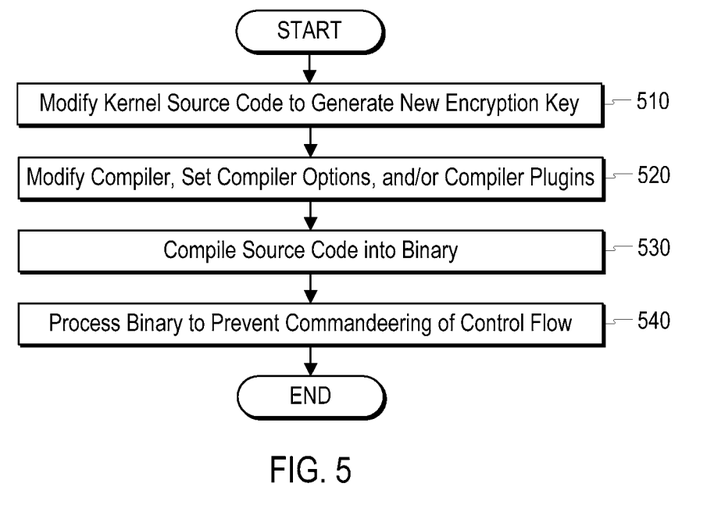
FIG. 5 is a flowchart of a method for generating a binary having secure control flow according to various embodiments of the present disclosure.

FIG. 5 is a flowchart of a method for generating a binary having secure control flow according to various embodiments of the present disclosure.

Referring to FIG. 5, a flowchart illustrates a method of generating a binary having secure control flow to prevent control flow exploits. Initially, at operation 510, the kernel source code is modified to protect encryption keys from leaking to the user space (i.e., key leakage), which will be discussed in detail below with reference to operation 720. In particular, transition points are identified in the kernel source code and instructions are inserted to generate a new encryption key based on a pseudo random resource or a random resource, identify return addresses in memory that are encrypted with the old encryption key, and reencrypt the return addresses based on the new encryption key during operation 510.

The transition points at operation 510 include any suitable context switch where key leakage may occur. For example, the transition points include a thread entry, which corresponds to a start point or an exit point of a thread. The thread entries may occur during a transition from a user space to a kernel space (e.g., a user application calls a kernel function), a thread entry between different kernel threads associated with either the user or the kernel, transitions between different processes, etc. As used herein, a process may include a single thread or may include multiple threads that execute sequentially or in parallel.

Further, in operation 510, a new encryption key is generated using a resource that provides a level of randomness. For example, if a processor is able to securely generate a true random value, the key may be generated using the random number generator. However, random number generators are known to have issues and, therefore, a different resource may be used. Processor architectures generally include a cycle counter that measures the execution of instructions in cycle intervals. Because the exact number of cycles that have executed is difficult to predict, the cycle counter may be sampled and used to generate a new encryption key, which will replace the encryption key stored in the reserved register, which will be discussed in further detail with reference to operation 610.

Although operation 510 will be described by manual modification by a designer, portions of the kernel modifications can be automated. For example, the designer may use a software tool to perform a regular expression pattern match to identify instructions that need to be modified based on the foregoing. The software tool may also be used to modify the instructions as needed.

In some instances, the stack may not have any contents. For example, during a user-to-kernel thread entry, the execution begins with a bottomed out (i.e., empty) stack and there are no relevant return addresses. In such an example, because there are no encrypted return addresses, such a transition would only involve generating a new encryption key.

At operation 520, the compiler may be modified, compiler options may be set, and compiler plugins are configured to load and perform tasks during the compiling of the binary. Operation 520 will be explained in further detail with reference to FIG. 6. At operation 530, the compiler is executed to compile a source code into a binary file. At operation 540, the binary is processed by a post-processing application to insert, modify, and delete instructions to prevent commandeering of the control flow. Although the instant example is related to modifying the source code before compiling and modifying the binary after compiling, it is possible to modify the compiler to entirely process the source code to prevent control flow as disclosed herein.

Figure 6:
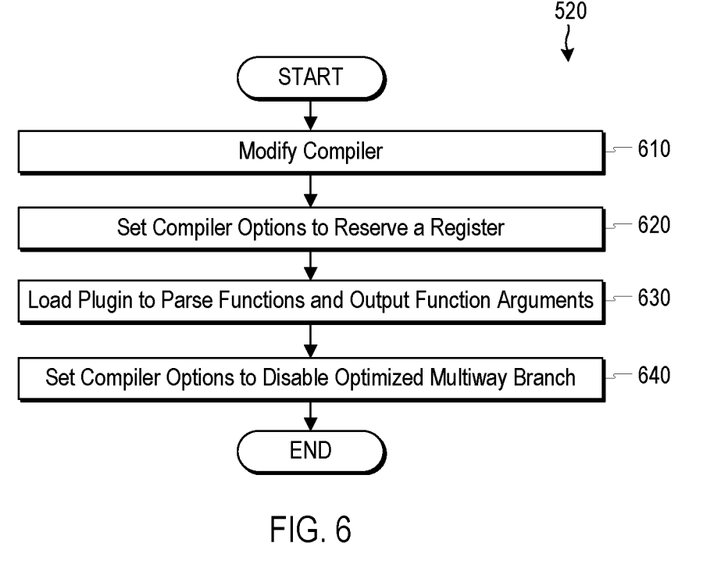
FIG. 6 is a flowchart of a method of setting compiler options for compiling a binary according to various embodiments of the present disclosure.

FIG. 6 is a flowchart of a method of setting compiler options for compiling a binary according to various embodiments of the present disclosure.

Referring to FIG. 6, which is an example implementation of operation 520, the compiler may be modified and various options and settings are provided to a compiler. These options and settings may be either provided in a configuration file, an argument provided to an executable that causes the compiler to compile the source code, or a setting in a graphical development environment.

First, at operation 610, the compiler itself may be modified. The modifications to the compiler may be simple or may be extensive. In particular, some modifications to the compiling process may be simpler to implement via modification of the binary after compiling, which is referred to as binary instrumentation. However, other modifications to the compiling process may be implemented into the compiler itself. Some of the modifications to the compiler may be, for example, preventing allocation of hardware registers in the processor, inserting of a no operation (NOP) instruction after particular instructions to facilitate binary modification, and so forth.

At operation 620, at least one register of the processor is reserved. However, for the sake of brevity and clarity, a single register will be reserved. The reserved register is selected based on the compiled binary to limit performance impact. For example, in ARM64, registers X16 and X17 are intra-procedure temporary registers and register X18 is the platform register and is used for platform application binary interfaces. However, these registers may not be used when compiling a monolithic kernel because such a kernel does not need to support relocatable code or functions requiring a long branch. Therefore, in a monolithic kernel, registers X16, X17, and X18 are generally unused and may be reserved by the compiler.

The reserved register, which is configured to be unavailable inside the kernel space, is used to store an encryption key for encrypting return addresses before placing the return addresses on the stack. That is, at operation 620, the compiler is configured such that the reserved register is not assigned to any instructions in the compiled binary. However, as will be discussed below with reference to operation 710, the reserved register may still be assigned to in the binary for limited purposes. To protect the integrity of the encryption key may be randomly generated during booting of the OS and, further, that encryption key may be protected by a temporary encryption key that is regenerated based on a specific event. In particular, if the specific event may cause the temporary encryption key to be accidentally leaked, on occurrence of the specific event, the temporary encryption key may be regenerated.

At operation 630, a plugin for the compiler is configured to parse functions in the source code and/or compiled binary to identify functions and output the arguments of the identified functions. The arguments of the functions are identified to prevent tampering with unused registers in that function as discussed below with reference to operation 740. At operation 640, compiler options are configured to disable multiway branch function. It is noted that operation 640 is provided to prevent a switch statement (i.e., a switch instruction in code) from being executed starting at an arbitrary point of the function. After setting of the compiler settings and options, the compiler is configured to compile the source code to generate a binary file having machine instructions to cause a processor to perform specific operations. In some example, the binary may be an operating system kernel, which provides an interface for applications to execute within the operating system kernel.

Figure 7:
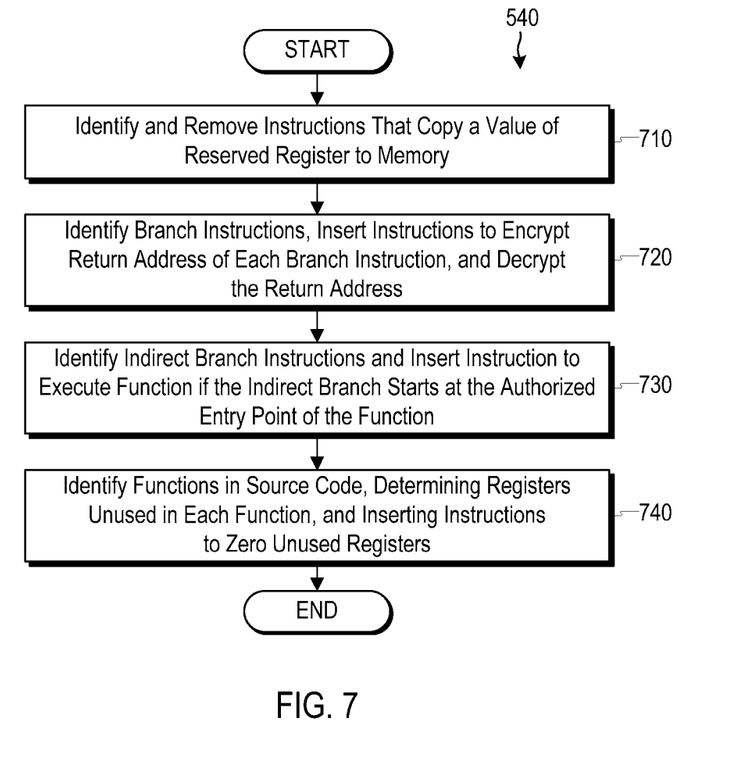
FIG. 7 is a flowchart of a method of processing a binary to secure control flow according to various embodiments of the present disclosure.

FIG. 7 is a flowchart of a method of processing a binary to secure control flow according to various embodiments of the present disclosure.

Referring to FIG. 7, which is an example implementation of operation 540, after the binary is compiled, the binary may be modified to prevent control flow exploits. In particular, a separate executable file, referred to as a post-processing application, modifies the binary to add, remove, and edit instructions of the binary to prevent control flow exploits. In particular, the post-processing application may use decompiled binary information and pattern matching to locate the instructions that should be changed. Although the post-processor is used for the instructions identified below, the instant disclosure may be applied to different instructions that may cause similar problems that the instant disclosure encompasses. Further, although the instructions below are related to ARM64, the disclosure can be applied to different architectures to prevent similar exploits.

At operation 710, the post-processing application may identify instructions that copy a value of the reserved register (or reserved registers) to memory and then remove each of the identified instructions. Some functions may disclose the content of the register when a specific event occurs even though the register was reserved in the compiler. For example, if an exception occurs in the kernel space, low-level code may save all registers to memory and, in this case, the content of the reserved register may be inadvertently available to an attacker. Therefore, to prevent the reserved register from leaking content, the post-processing application may remove instructions that copy a value in the reserved register into the memory.

Further, at operation 710, the link register X30, which stores the return address, may be deemed to be reserved because it is the only register that stores an unencrypted return address. Therefore, to prevent leakage of any unencrypted return address, register X30 may be deemed to be reserved during operation 710.

At operation 720, the post-processing application processes branch instructions in the binary to prevent control flow exploits by encrypting the return address and decrypting return addresses using an encryption key stored in the reserved register. To encrypt the return address, the post-processing application may change a no operation instruction (NOP) before a storage instruction (e.g., STP) into an exclusive or (XOR) instruction to encrypt the content. To decrypt the return address, the post-processing application may change a no operation instruction (NOP) before a load instruction (e.g., LDP) into an exclusive or (XOR) instruction to decrypt the content. Thus, the post-processing application identifies branch instructions in the binary, identifies instructions to copy a return address from a register (e.g., the link register X30 stores the return address) into memory, inserts instructions to encrypt the return address before the return address is copied to memory, and inserts instructions to decrypt the return address after it is copied from memory into the register. Operation 720 can be used to prevent a type of control flow change that are sometimes referred to as return-oriented programming.

In one example, at operation 720, the encryption is an exclusive OR (XOR) encryption. As long as the encryption key is not available to the user, an attacker will not be able to obtain the return address of the branch instruction, thereby preventing the attacker from hijacking return addresses. However, if the attacker is able to insert a malicious return address, the XOR decryption will cause the malicious return address to change to an unknown value, which will disrupt the entire control flow and cause a kernel crash.

If an encrypted pointer and an unencrypted pointer leaks (or is known), the attacker may be able to regenerate the key by applying an XOR operation on these values, thereby causing the key to leak (i.e., key leakage). For example, a malicious application in the user space may execute kernel code that contains a memory disclosure bug (e.g., a buggy system call). In this example, when the execution returns from the kernel space to the malicious code in the user space, the attacker may discover the key, target a kernel function to execute, and then issue another buggy system call (i.e., transition back into kernel space) with a memory write bug that overwrites a memory address. Therefore, a static encryption key may not be sufficient to protect the control flow. However, as described above with reference to operation 510, because the encryption key is continually regenerated at the identified transition points and the encrypted addresses are continually reencrypted with the new encryption keys, any leaked key will have been regenerated before it will be available to the hacker, thereby preventing any attacker decrypting the return addresses that are stored in the stack.

At operation 730, the post-processing application is configured to replace each indirect branch (e.g., BLR) with a direct branch to an authentication function that executes the function if the function execution starts at an authorized start point. If the function does not enter the function at the authorized start point, the execution of the function is omitted. Operation 730 can be used to prevent a type of control flow change that are sometimes referred to as jump-oriented programming.

For instance, the post-processing application at operation 730 is configured to replace a no operation instruction (NOP) directly above each compiled function with an authentication sequence. The authentication sequence represents a static number and does not correspond to an instruction. Because all indirect branch instructions are replaced with a direct branch to the authentication function, the authentication function loads a 32-bit word before the target address of the indirect branch. If the 32-bit word before the target address of the indirect branch corresponds to the authentication sequence, then the authentication function determines that the indirect branch target is the start of the function. However, if the 32-bit word before the target address of the indirect branch does not correspond to the authentication sequence, the target of the original indirect branch instruction is not the start of the function and the authentication function.

The function of operation 730 is to ensure that an attacker forms gadgets that start at an entry point of the function and end at the first indirect branch of the function. This prevents the attacker from saving register arguments on the stack and overwriting previous stack frames.

After instructions are inserted into the binary to authenticate functions of the binary, at operation 740, the post-processing application is configured to identify functions in the source code and zero unused registers. In particular, as noted above in operation 630, a plugin is used to generate the function information that convert information from an abstract syntax template (.AST) file into a text file. During operation 740, the post-processing application uses information in the generated text file to determine registers that are unused in each function and then inserts instructions to zero the value of each unused registers. That is, for example, the post-processing application may replace a no operation instruction (NOP) in the function to an instruction to zero the value in the unused registers. As noted above, generally the registers X0-X8 are used for the arguments of each function, with any additional arguments being saved onto the stack. By zeroing the register that is not used in any indirect branch instruction, any gadget chains formed by indirect branch will be disrupted (by zeroing the registers) to prevent any control flow exploits.

After disrupting gadget state by authenticating functions at operation 730 and zeroing registers at operation 740, the remaining indirect branch instruction that remains to address is code that is generated based on switch statements, which is generally referred to as a multiway branch. However, as described above with reference to operation 630, a compiler option may be configured to disable optimized multiway branch. Therefore, after operation 740, the post-processing application is finished modifying the binary. Operation 740 can be used to prevent gadget chaining which a common technique used to change the control flow of a program to achieve what is sometimes referred to as jump-oriented programming.

The binary as modified by the method of FIG. 7 prevents return addresses from being overwritten by virtue of their encryption and continuous cycling of the encryption keys. Further, the binary prevents gadgets from being chained together by authenticating that the function enters at the start point and zeros any used registers to prevent an attacker from saving variables in the registers.

Figure 8:
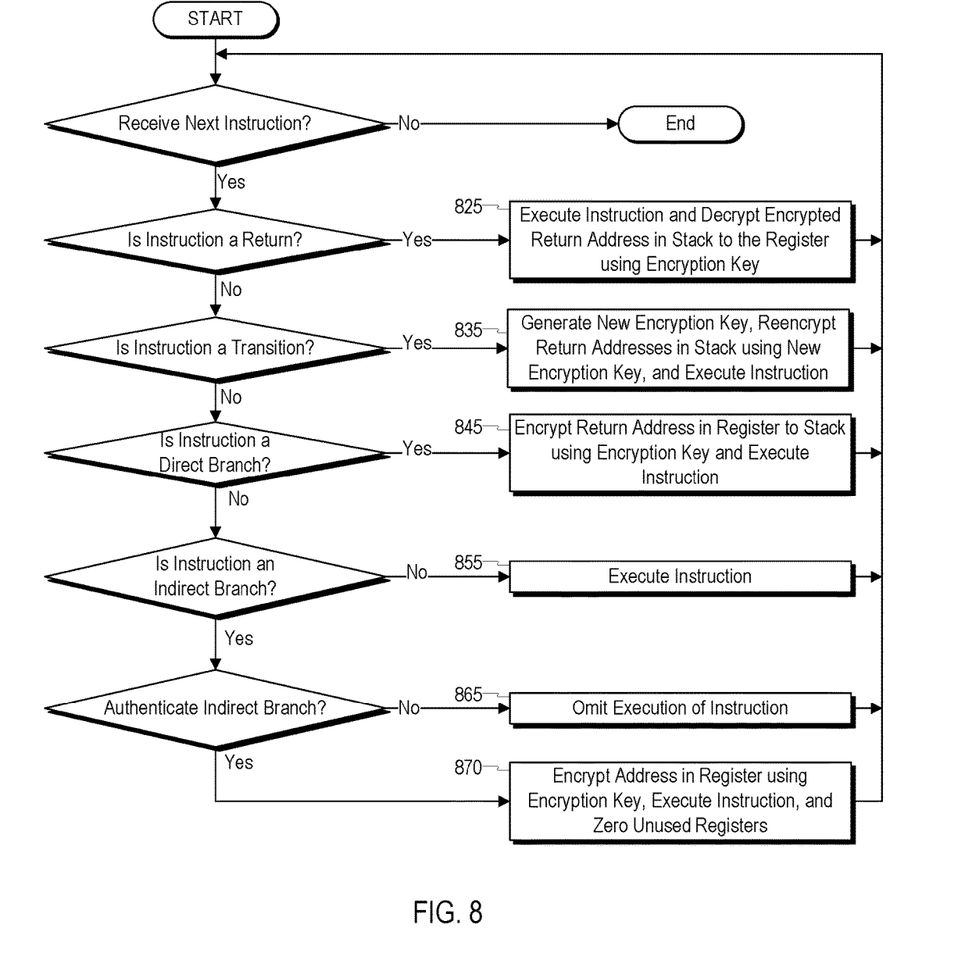
FIG. 8 is a flowchart of a method of executing a binary having secure control flow according to various embodiments of the present disclosure.

FIG. 8 is a flowchart of a method of executing a binary having secure control flow according to various embodiments of the present disclosure.

Referring to FIG. 8, the illustrated flowchart illustrates a control flow of a binary as it receives instructions to execute from the binary and provides mechanisms to prevent hijacking of its execution by an attacker. That is, the flowchart in FIG. 8 illustrates how control flow of the kernel is affected based on the foregoing. It is noted that conventional instructions that already are performed are not described in the method illustrated in FIG. 8. For example, when a function in the source code ends, a compiler inserts instructions to restore the processor to settings associated with a previous function that are stored on the stack.

Initially, the method starts by receiving a next instruction at operation 810. If there is no next instruction, the method ends. If there is a next instruction, at operation 820, the method determines if the instruction corresponds to a return (from a branch) instruction. If the instruction corresponds to the return function, at operation 825, the method executes the return instruction based on a value in a register (e.g., X30), decrypts an encrypted return address that is identified by the frame pointer into a register (e.g., the link register x30) using an encryption key. The encryption key is protected in a reserved register. After the memory address is decrypted, the method returns to operation 810 to receive the next instruction.

Referring back to operation 820, if the instruction is not a return instruction, the method determines if the instruction corresponds to a transition at operation 830. If the instruction corresponds to a transition at operation 830, the method reencrypts any return addresses in the stack at operation 835. Specifically, at operation 835, the method generates a new encryption key (e.g., using a value of the cycle counter), and reencrypts the return addresses of previous branch instructions based on the new encryption key, which can be identified using the frame pointer, and then executes the instruction associated with the transition. After the instruction is executed, the method returns to operation 810 to receive the next instruction.

Referring back to operation 830, if the instruction does not corresponds to a transition, at operation 840, the method determines if the instruction corresponds to a direct branch instruction. If the instruction corresponds to a direct branch at operation 840, the method encrypts a return address stored in a register (e.g., the link register X30) using an encryption key into the stack and then executes the instruction in operation 855. After the instruction is executed, the method returns to operation 810 to receive the next instruction.

Referring back to operation 840, if the instruction does not corresponds to a direct branch, at operation 850, the method determines if the instruction corresponds to an indirect branch instruction. If the instruction does not corresponds to an indirect branch instruction at operation 850, the method executes the instruction at operation 855 and returns to operation 810 to receive the next instruction.

If the instruction does corresponds to an indirect branch instruction at operation 850, the method authenticates the indirect branch instruction at operation 860. For example, the method may determine if an address of the indirect branch instruction corresponds to a start point of a function. If the method does not authenticate the indirect branch instruction, the method omits the execution of the instruction at operation 865 and returns to operation 810 to receive the next instruction. If the method does authenticate the indirect branch instruction, the method encrypts a return address in the register into the stack using an encryption key, executes the instruction to branch to a function, and zeroes unused registers of the function at operation 870. After zeroing the unused registers, the method returns to operation 810 to receive the next instruction.

The method illustrated in FIG. 8 prevents an attacker from properly decrypting return addresses. Because the method reencrypts the return addresses at intervals based on a pseudo random key, the attacker is unable to hijack the control flow by overwriting return addresses. If the attacker is able to overwrite a return address, when the inserted return address is decrypted, the encryption key will have changed and the resulting return address will be incorrect and will cause the execution of the binary to jump to an unknown location, thereby causing the binary to crash. Further, the method prevents at attacker from chaining together functions and hijacking indirect branches by enforcing applications to start at an authenticated location and clearing any unused registers. Therefore, an attacker will not be able to commandeer the control flow based on the described methods.

As is apparent from the forgoing description, a method and an electronic device for protecting kernel control-flow integrity using static binary instrumentation is disclosed.

Although the foregoing description describes using static binary instrumentation to modify the binary after compilation, the disclosure may be applied to a compiler to implement the foregoing policies. The compiler may implement the disclosed policies automatically or via a setting.

The term "module" as used herein may include its ordinary meaning including, for example, a unit of one, or a combination of two or more of hardware, software, and firmware. The term "module" may be used interchangeably with terms such as, for example, unit, logic, logical block, component or circuit. A "module" may be the smallest unit of an integrated part or a portion thereof. A "module" may be the smallest unit for performing one or more functions, or a portion thereof. A "module" may be implemented mechanically, or electronically. For example, a "module" may include at least one of a known, or to-be-developed, application-specific IC (ASIC) chip, field-programmable gate array (FPGA) or programmable logic device that perform certain operations.

At least a part of devices (for example, modules or their functions) or methods (for example, operations) according to various embodiments of the present disclosure may be implemented as commands stored in a computer-readable storage medium, in the form of a programming module. When the commands are executed by a processor, one or more processors may execute functions corresponding to the commands. The computer-readable storage medium may be, for example, the memory 130.

The computer-readable medium may include hard disk, floppy disk, magnetic media (for example, magnetic tape), optical media (for example, compact disc ROM (CD-ROM)), DVD, magneto-optical media (for example, floptical disk), hardware devices (for example, ROM, RAM or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

A module or a programming module according to various embodiments of the present disclosure may include one or more of the above-described components, may omit a portion thereof, or may include additional components. Operations that are performed by a module, a programming module or other components according to the present disclosure may be processed in a serial, parallel, repetitive or heuristic manner. Also, some operations may be performed in a different order or omitted, or additional operations may be added. The embodiments disclosed in the present specification are provided for description and understanding of the present disclosure, not limiting the scope of the present disclosure. Accordingly, the scope of the present disclosure should be interpreted as embracing all modifications or various embodiments within the scope of the present disclosure therein.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of executing a binary in a processor, the method comprising:
   receiving a next instruction;
   determining if the next instruction corresponds to a particular instruction;
   when the next instruction corresponds to a return instruction, copying a first encrypted return address of a set of encrypted return addresses into a first register and decrypting a first return address based on a first encryption key;
   when the next instruction corresponds to a transition point, decrypting the set of encrypted return addresses based on the first encryption key and encrypting the set of return addresses based on a second encryption key; and
   when the next instruction corresponds to a direct branch instruction, encrypting a second address in the first register and adding the second encrypted return address to the set of encrypted return addresses,
   wherein the first encryption key is stored in a reserved register, and
   wherein the set of encrypted return addresses is stored in a memory.

2. The method of claim 1, further comprising:
   when the next instruction corresponds to the transition point, generating the second encryption key based on a cycle counter of the processor.

3. The method of claim 2, wherein the transition point comprises a kernel thread entry or a user thread entry.

4. The method of claim 3, further comprising traversing a frame pointer to identify memory locations of the set of encrypted return addresses.

5. The method of claim 1, further comprising:
   when the next instruction corresponds to an indirect branch instruction, determining if an address associated with the indirect branch instruction corresponds to a start point of a function;
   executing the function when the address corresponds to a start point of the function; and
   omitting execution of the function when the address does not correspond to the start point of the function.

6. The method of claim 5, further comprising:
   when the next instruction corresponds to the indirect branch instruction, inserting a zero value into at least one register that is unused by the function.

7. An apparatus comprising:
   a memory configured to store instructions; and
   a processor configured to execute the instructions to:
   receive a next instruction,
   determine if the next instruction corresponds to a particular instruction,
   when the next instruction corresponds to a return instruction, copy a first encrypted return address of a set of encrypted return addresses into a first register and decrypt a first return address based on a first encryption key,
   when the next instruction corresponds to a transition point, decrypt the set of encrypted return addresses based on the first encryption key and encrypt the set of return addresses based on a second encryption key, and
   when the next instruction corresponds to a direct branch instruction, encrypt a second address in the first register and add the second encrypted return address to the set of encrypted return addresses,
   wherein the first encryption key is stored in a reserved register, and
   wherein the set of encrypted return addresses is stored in the memory.

8. The apparatus of claim 7, wherein the processor is further configured to execute the instructions to, when the next instruction corresponds to the transition point, generate the second encryption key based on a cycle counter of the processor.

9. The apparatus of claim 8, wherein the transition point comprises a kernel thread entry or a user thread entry.

10. The apparatus of claim 9, wherein the processor is further configured to execute the instructions to traverse a frame pointer to identify memory locations of the set of encrypted return addresses.

11. The apparatus of claim 7, wherein the processor is further configured to execute the instructions to:
when the next instruction corresponds to an indirect branch instruction, determine if an address associated with the indirect branch instruction corresponds to a start point of a function,
execute the function when the address corresponds to a start point of the function, and
omit execution of the function when the address does not correspond to the start point of the function.

12. The apparatus of claim 11, wherein the processor is further configured to execute the instructions to:
when the next instruction corresponds to the indirect branch instruction, insert a zero value into at least one register that is unused by the function.

13. A non-transitory computer readable medium comprising instructions that, when executed, configure a processor to:
receive a next instruction;
determine if the next instruction corresponds to a particular instruction;
when the next instruction corresponds to a return instruction, copy a first encrypted return address of a set of encrypted return addresses into a first register and decrypt a first return address based on a first encryption key;
when the next instruction corresponds to a transition point, decrypt the set of encrypted return addresses based on the first encryption key and encrypt the set of return addresses based on a second encryption key; and
when the next instruction corresponds to a direct branch instruction, encrypt a second address in the first register and add the second encrypted return address to the set of encrypted return addresses,
wherein the first encryption key is stored in a reserved register, and
wherein the set of encrypted return addresses is stored in a memory.

14. The non-transitory computer readable medium of claim 13, wherein the instructions further configure the processor to, when the next instruction corresponds to the transition point, generate the second encryption key based on a cycle counter of the processor.

15. The non-transitory computer readable medium of claim 14, wherein the transition point comprises a kernel thread entry or a user thread entry.

16. The non-transitory computer readable medium of claim 15, wherein the instructions further configure the processor to traverse a frame pointer to identify memory locations of the set of encrypted return addresses.

17. The non-transitory computer readable medium of claim 13, wherein the instructions further configure the processor to:
when the next instruction corresponds to an indirect branch instruction, determine if an address associated with the indirect branch instruction corresponds to a start point of a function,
execute the function when the address corresponds to a start point of the function, and
omit execution of the function when the address does not correspond to the start point of the function.

18. The non-transitory computer readable medium of claim 17, wherein the instructions further configure the processor to:
when the next instruction corresponds to the indirect branch instruction, insert a zero value into at least one register that is unused by the function.

\* \* \* \* \*